United States Patent [19]

Brown et al.

[11] Patent Number: 4,976,577

[45] Date of Patent: Dec. 11, 1990

[54] LOCKING BOLT ASSEMBLY

[75] Inventors: Steve K. Brown, Lynchburg; Larry D. Dixon, Forest; Joseph F. Sharrow, King George, all of Va.

[73] Assignee: The Babcock & Wilcox Company, New Orleans, La.

[21] Appl. No.: 542,500

[22] Filed: Jun. 25, 1990

[51] Int. Cl.$^5$ ............................................. F16B 39/02
[52] U.S. Cl. ...................................... 411/271; 411/45; 411/325; 411/954
[58] Field of Search ............... 411/271, 265, 266, 259, 411/325, 41, 45–48, 433, 935, 954

[56] References Cited

U.S. PATENT DOCUMENTS

| | | | |
|---|---|---|---|
| 1,409,817 | 3/1922 | Bilterman | 411/954 |
| 2,877,749 | 2/1959 | Kalb | 411/935 |
| 3,042,094 | 7/1962 | Liljeberg | 411/271 |

FOREIGN PATENT DOCUMENTS

| | | | |
|---|---|---|---|
| 59437 | 12/1967 | German Democratic Rep. | 411/271 |
| 186856 | 10/1922 | United Kingdom | 411/271 |

Primary Examiner—Neill R. Wilson
Attorney, Agent, or Firm—R. J. Edwards; D. Neil LaHaye

[57] ABSTRACT

A locking bolt assembly that prevents the release of loose parts in the event of bolt failure. A bolt having a head and threaded main body portion is provided with a central bore through the head and main body portion. The central bore has a necked down area adjacent the end of the main body portion away from the head. A plurality of slots along the end of the main body portion in communication with the central bore form bolt fingers around the necked down area. A plunger slidably received in the central bore places radial pressure at the necked down area to expand the bolt fingers outwardly and lock the bolt in its installed position without changing the preload of the installed bolt. The plunger is retained in its bolt locking position and prevents the release of loose parts in the event of bolt failure.

11 Claims, 1 Drawing Sheet

LOCKING BOLT ASSEMBLY

BACKGROUND OF THE INVENTION

1. Field of the Invention

The present invention is generally related to fasteners and in particular to a bolt that is locked into position and prevents the release of loose parts in the event the bolt breaks.

2. General Background

In a variety of situations, especially in nuclear power plants, many bolts are locked in position to prevent loosening and to capture the bolt head to prevent loose parts from entering the system if a bolt should fail. Methods used to capture and lock bolts are to incorporate welded locking cups or bolt heads, staked lock nuts, upset threads, or lock nuts. Methods requiring welding are not acceptable when performing field work on radioactive parts because most of this work must be performed underwater and underwater welding for such an application is unavailable. Patented devices directed toward locking fasteners of which applicants are aware include the following.

U.S. Pat. No. 4,411,570 discloses a tamper-proof fastener where a pin is driven into a bore in the fastener to deflect a fastener leg outwardly and lock it in its installed position. The pin is headless and fits flush with the head of the fastener to prevent tampering.

U.S. Pat. No. 3,042,094 discloses an expander received inside a bolt to cause locking of the threads with the nut.

U.S. Pat. No. 2,438,533 discloses the use of a pin to spread two arms of the stud apart to lock the stud in place.

U.S. Pat. No. 1,409,817 discloses the use of a locking key that causes a slotted end of the bolt to expand and lock with a nut. Separated portions of the key are bendable to prevent separation of the key and bolt while the key head is received in a recess in the bolt head.

U.S. Pat. Nos. 2,871,749; 2,463,859; 322,657 and French Patent No. 867,253 all disclose locking members that are threaded into the bore through the center of the bolt.

U.S. Pat. Nos. 2,314,445 and 2,181,103 disclose smooth unthreaded rivets secured with center-bore drive pins.

U.S. Pat. Nos. 1,372,291; 1,033,120 and 990,065 disclose designs where the locking force is applied from the end of the bolt toward the head.

U.S. Pat. No. 2,370,327 discloses the use of a tubular insert for permanent anchorage in environments where vibrations and ordinary operating stresses may cause loosening.

Although a variety of locking bolts are known in the art, there exists a need for a locking bolt that can be installed and removed by access to only one side of the bolt, that prohibits the release of loose parts if the head of the bolt should separate from the main body portion, and that does not add preload to the bolt which can result in increased bolt failures.

SUMMARY OF THE INVENTION

The present invention solves the aforementioned problems in a straightforward manner. What is provided is a bolt, a plunger, and a snap ring. The bolt has a center bore therethrough to accept the plunger with a concentric counterbore in the head to accept the head of the plunger. The bore is provided with a necked down area, or a reduced diameter, adjacent the bottom of the bolt. The plunger is provided with a corresponding portion having a larger diameter than the necked down portion of the bore. Slots machined in the end of the bolt allow outward expansion of this threaded portion of the bolt in response to installation of the plunger. A snap ring installed in the lower end of the bore fits into a groove in the end of the plunger to retain the plunger in place even in the event of failure of the bolt head. The head of the plunger may also be staked in place in the counterbore in the bolt head.

BRIEF DESCRIPTION OF THE DRAWINGS

For a further understanding of the nature and objects of the present invention reference should be had to the following description, taken in conjunction with the accompanying drawings, in which like parts are given like reference numerals and wherein.

DETAILED DESCRIPTION OF THE PREFERRED EMBODIMENT

Figure 1:
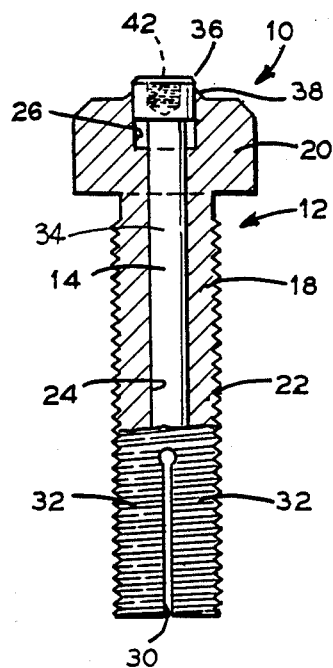
FIG. 1 is a partial sectional view of the invention in its unlocked position.

Referring to the drawings, it is seen that the invention is generally indicated by the numeral 10. Locking bolt assembly 10 is generally comprised of bolt 12, plunger 14, and snap ring 16.

Bolt 12 has a main body portion 18 with head 20 at one end having a greater outer diameter than main body portion 18. Head 20 may be of any suitable shape, such as hexagonal, for the attachment of wrenches or sockets used during installation and removal. Threads 22 are provided along the length of main body portion 18 in a size and pitch matching that of the workpiece not shown that locking bolt assembly 10 is to be attached to. Bolt 12 is provided with central bore 24 therethrough along its longitudinal axis. As best seen in FIG. 1, central bore 24 is enlarged to form counterbore 26 in head 20 for receiving the head of plunger 14. Central bore 24 is provided with necked down area 28 adjacent the bottom of bolt 12, best seen in FIG. 2, which is of less diameter than the remainder of central bore 24. Bolt 12 is provided with at least on slot 30 at the end opposite that of head 20 that runs longitudinally from the end along a part of main body portion 18 and extends through the entire radius so as to interconnect with central bore 24. In the preferred embodiment, four slots 30 are provided and evenly spaced about the circumference of main body portion 18. This creates four bolt fingers 32 of which two can be seen in FIG. 1.

Figure 2:
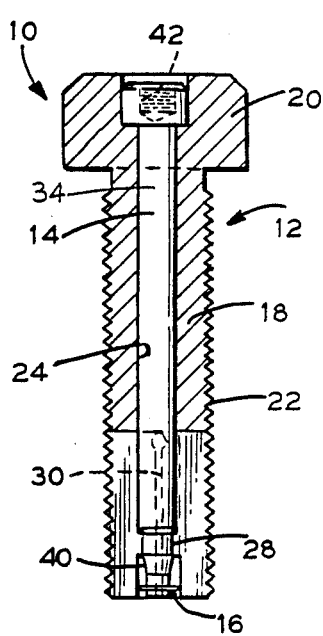
FIG. 2 is a sectional view of the invention in its locked position.

Plunger 14 is formed from a main body portion 34 that has an enlarged head 36 at one end. Main body portion 34 is sized to be slidably received within central bore 24 of bolt 12. Head 36 of plunger 14 is sized to be slidably received within counterbore 26 of bolt 12 such that when fully inserted the upper edge of plunger head 36 is slightly below the upper edge of bolt head 20. The lower end of plunger 14 is of a slightly smaller diameter than main body portion 34 and tapers outwardly as seen in FIG. 2 to the normal diameter of main body portion 34 which is larger than the inner diameter of necked down area 28. Tapered portion 40 allows easy insertion of plunger 14 beyond necked down area 28. Upon insertion of plunger 14 to this point, the larger diameter of main body portion 34 above tapered portion 40 bears against necked down area 28 and causes radial outward movement of bolt fingers 32 into tighter locking engagement with the workpiece that bolt 10 is threaded into.

Figure 3:
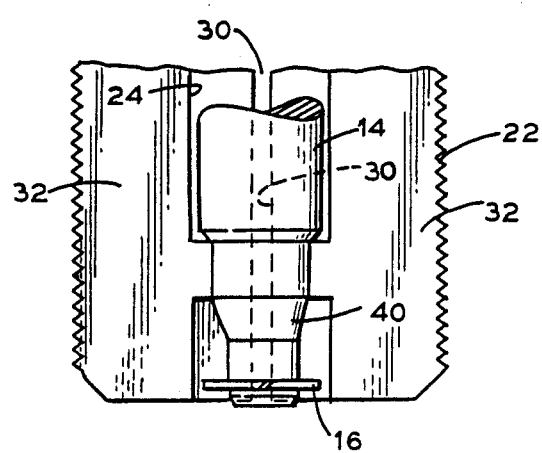
FIG. 3 is a detailed sectional view illustrating the snap ring and locking function of the plunger of the invention.

Means for retaining plunger 14 in its second bolt locking position is provided in the form of raised area 38 around counterbore 26. When plunger 14 is fully inserted in central bore 24, as seen in FIG. 2, raised area 38 may be staked down over the edges of plunger head 36. Means for retaining plunger 14 in its first unlocking or bolt installation/removal position is provided in the form of snap ring 16. Snap ring 16, best seen in FIG. 3, is received within a circumferential groove adjacent the end of plunger 14 below tapered portion 40. This provides two independent retention means for plunger 14 in preventing the release of loose parts in the event of bolt failure. Means for removal of plunger 14 to allow unlocking and removal of bolt 10 is provided in the form of threaded recess 42 in plunger head 36. A tool not shown is threaded into recess 42 and then used to remove plunger 14 from central bore 24. This relieves the outward pressure of plunger main body portion 34 against necked down area 28 and allows bolt fingers 32 to move radially inward.

In operation, plunger 14 is inserted into bolt 12 in its second bolt locking position, snap ring 16 is installed on the end of plunger 14, and plunger 14 is then retracted to its first unlocking position. Bolt 12 is then installed by threading it into a workpiece or nut and torqued to a predetermined value. During this installation, plunger 14 is in its first unlocking or bolt installation/removal position as seen in FIG. 1. To lock bolt assembly 10 in its installed position, plunger 14 is fully inserted into central bore 24 in its second bolt locking position as seen in FIG. 2. During insertion, tapered portion 40 allows easy movement of main body portion 14 across necked down area 28. Main body portion 14, which is larger in diameter than necked down area 28 causes outward radial movement of bolt fingers 32, which is allowed by slots 30 spaced around the end of main body portion 18 of bolt 12. Threads 22 are thus caused to move into a tighter contact with the corresponding threads of the workpiece to prevent unwanted loosening. When using a nut that engages bolt 12 above slots 30 the expanded threads will actually be on one side of the nut and act in the same fashion as a rivet to prevent loosening. Snap ring 16 is received in a groove adjacent the end of plunger 14 to retain it in its first unlocking or bolt installation/removal position and to prevent the release of loose parts in the event of bolt failure. Raised area 38 may also be staked down over the edge of plunger head 36 to serve as a retainer. It should be noted that the expansion of threads 22 does not change the torque preload. In the event of bolt failure, which normally occurs close to the head of the bolt along the main body portion, plunger 14 prevents the head and main body portion from separating and becoming loose parts that could cause damage in a system such as a nuclear steam supply system. Removal of bolt assembly 10 may be accomplished when access to only the head is available by threading an appropriate tool not shown into threaded recess 42 in plunger head 36 and retracting plunger 14 from its second bolt locking position to its first bolt installation/removal position. This allows bolt fingers 32 to retract radially inward and easy removal of bolt 12 from the workpiece or nut.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A locking bolt assembly, comprising:
   a. a threaded bolt having a central bore therethrough;
   b. said bore having a necked down area adjacent one end of said bolt;
   c. a plunger slidably received in said central bore and movable between a first bolt installation/removal position and a second bolt locking position; and
   d. means for retaining said plunger in its second bolt locking position, comprising a raised area around one end of said central bore capable of being staked down over said plunger when in its second bolt locking position.

2. The bolt assembly of claim 1, wherein said bolt is provided with a plurality of longitudinal slots along one end, forming bolt fingers around said necked down area of said central bore.

3. The bolt assembly of claim 1, wherein said plunger is provided with a threaded recess at one end.

4. The bolt assembly of claim 1, further comprising means for retaining said plunger in its first bolt installation/removal position.

5. The bolt assembly of claim 4, wherein said means for retaining said plunger in its first bolt installation/removal position comprises:
   a. a circumferential groove around and adjacent one end of said plunger; and
   b. a snap ring received within said circumferential groove.

6. A locking bolt assembly, comprising:
   a. a bolt having a head, a threaded main body portion, and a central bore through the head and main body portion;
   b. a necked down area in the central bore adjacent the end of the main body portion away from the head;
   c. a plurality of slots along a length of said main body portion, forming bolt fingers around said necked down area;
   d. a plunger slidably received in said central bore and movable between a first bolt installation/removal position and a second bolt locking position; and
   e. means for retaining said plunger in its second bolt locking position, comprising a raised area around one end of said central bore capable of being staked down over said plunger when in its second bolt locking position.

7. the bolt assembly of claim 6, wherein said plunger causes radial outward movement of said bolt fingers when in said second bolt locking position.

8. The bolt assembly of claim 6, wherein said plunger is provided with a threaded recess at one end.

9. The bolt assembly of claim 6, further comprising means for retaining said plunger in its first bolt installation/removal position.

10. The bolt assembly of claim 9, wherein said means for retaining said plunger in its first bolt installation/removal position comprises:
    a. a circumferential groove around and adjacent one end of said plunger; and b. a snap ring received within said circumferential groove.

11. A locking bolt assembly, comprising:

a. a bolt having a head, a threaded main body portion, and a central bore through the head and main body portion;

b. a necked down area in the central bore adjacent the end of the main body portion away from the head;

c. a plurality of slots along a length of said main body portion, forming bolt fingers around said necked down area;

d. a plunger slidably received insaid central bore and movable between a first bolt installation/removal position and a second bolt locking position;

e. means for retaining said plunger in its second bolt locking position, comprising a raised area around one end of said central bore capable of being staked down over said plunger when in its second bolt locking position; and f. means for retaining said plunger in its first installation/removal position, comprising a circumferential groove around and adjacent one end of said plunger and a snap ring received within said circumferential groove.

* * * * *